United States Patent
Guo et al.

(10) Patent No.: US 12,301,082 B2
(45) Date of Patent: May 13, 2025

(54) STATOR, FLAT WIRE MOTOR, POWERTRAIN, AND VEHICLE

(71) Applicant: Huawei Digital Power Technologies Co., Ltd., Shenzhen (CN)

(72) Inventors: Qiqi Guo, Shanghai (CN); Yu Wang, Shanghai (CN); Zhao Zhou, Dongguan (CN); Yang Zheng, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 246 days.

(21) Appl. No.: 17/944,424

(22) Filed: Sep. 14, 2022

(65) Prior Publication Data

US 2023/0009407 A1    Jan. 12, 2023

(30) Foreign Application Priority Data

Oct. 30, 2021  (CN) .......................... 202111277405.6

(51) Int. Cl.
*H02K 3/28* (2006.01)
*H02K 3/12* (2006.01)

(52) U.S. Cl.
CPC ................. *H02K 3/28* (2013.01); *H02K 3/12* (2013.01); *H02K 2213/03* (2013.01)

(58) Field of Classification Search
CPC .................................... H02K 3/28; H02K 3/12
See application file for complete search history.

(56) References Cited

U.S. PATENT DOCUMENTS

| | | | |
|---|---|---|---|
| 6,995,492 B1 * | 2/2006 | Kouda | H02K 3/28 310/201 |
| 9,379,586 B2 | 6/2016 | Rahman et al. | |
| 2006/0033394 A1 * | 2/2006 | Ogawa | H02K 3/12 310/179 |
| 2021/0305869 A1 * | 9/2021 | Sakuma | H02K 3/28 |

FOREIGN PATENT DOCUMENTS

| | | |
|---|---|---|
| CN | 109586456 A | 4/2019 |
| CN | 110011450 A | 7/2019 |
| CN | 110829641 A | 2/2020 |
| CN | 110971039 A | 4/2020 |
| CN | 111355317 A | 6/2020 |
| CN | 112531933 A | 3/2021 |
| CN | 112583168 A | 3/2021 |
| CN | 212850004 U | 3/2021 |
| CN | 113348607 A | 9/2021 |

(Continued)

*Primary Examiner* — Tulsidas C Patel
*Assistant Examiner* — Mohammed Ahmed Qureshi
(74) *Attorney, Agent, or Firm* — Maier & Maier, PLLC

(57) ABSTRACT

A stator includes a stator core and a stator winding. An inner wall of the stator core is provided with M winding slots, the M winding slots are uniformly disposed in a circumferential direction of the inner wall of the stator core. The stator winding includes flat wire conductors inserted in the winding slots, N layers of flat wire conductors are disposed in any one of the winding slots, and phase units of a first-phase winding, phase units of a second-phase winding, and phase units of a third-phase winding are sequentially and periodically arranged along the inner wall of the stator core. Each phase winding includes P parallel branches. Any one of the parallel branches connects flat wire conductors of M·N/3P layers.

20 Claims, 20 Drawing Sheets

(56) References Cited

FOREIGN PATENT DOCUMENTS

| | | | |
|---|---|---|---|
| CN | 113422453 | A | 9/2021 |
| CN | 114204708 | A | 3/2022 |
| JP | 2012222874 | A | 11/2012 |
| WO | 2019228465 | A1 | 12/2019 |
| WO | 2019231002 | A1 | 12/2019 |

* cited by examiner

STATOR, FLAT WIRE MOTOR, POWERTRAIN, AND VEHICLE

CROSS-REFERENCE TO RELATED APPLICATION

This application claims priority to Chinese Patent Application No. 202111277405.6, filed on Oct. 30, 2021, which is hereby incorporated by reference in its entirety.

TECHNICAL FIELD

The embodiments relate to the field of power devices, a stator, a flat wire motor, a powertrain, and a vehicle.

BACKGROUND

Because a flat wire motor has a high copper slot fill, heat dissipation of a winding of the motor is facilitated, a voltage endurance capability of the winding can be improved, an end length of the winding can be reduced, and the like. Accordingly, a torque density and a power density of the motor may be improved. Therefore, the flat wire motor has become an important measure to promote a lightweight vehicle, increase an endurance mileage of an electric vehicle, improve space utilization of a vehicle, and reduce costs of a powertrain.

An existing motor has a wave winding or lap winding structure. Flat wire conductors in the winding structure may have a plurality of layers, so that an alternating current resistance of the motor may be effectively reduced. However, as a quantity of layers of the flat wire conductors increases, a wiring mode of the winding structure is different. In an existing winding structure, three phase windings each are usually provided with a plurality of parallel branches, and wire-in ends and wire-out ends of the plurality of parallel branches are disposed at a welding end or a plug-wire end of a stator winding. The wire-in ends and the wire-out ends may not be flexibly switched between the welding end and the plug-wire end. Therefore, the stator winding of the existing motor may not be flexible, the stator winding may be poor in adaptability, and the wire-in ends and the wire-out ends of the parallel branches may not be freely adjusted as required.

SUMMARY

The embodiments may provide a stator, a flat wire motor, a powertrain, and a vehicle, to improve flexibility of a structure of a stator winding in the stator, so that a wire-in end and a wire-out end of a parallel branch can be changed as required.

According to a first aspect, the embodiments may provide a stator of a flat wire motor. The stator includes a stator core and a stator winding. An inner wall of the stator core is provided with M winding slots, the M winding slots are uniformly disposed in a circumferential direction of the inner wall of the stator core, and any one of the winding slots extends in an axial direction of the stator core, where M is a natural number that is a multiple of 3. The stator winding includes flat wire conductors inserted in the winding slots, N layers of flat wire conductors are disposed in any one of the winding slots, the flat wire conductors are grouped and then each are connected by using a connecting wire to separately form a first-phase winding, a second-phase winding, and a third-phase winding, any phase winding includes a plurality of phase units, and phase units of the first-phase winding, phase units of the second-phase winding, and phase units of the third-phase winding are sequentially and periodically arranged along the inner wall of the stator core. Each phase winding includes P parallel branches. N is a multiple of 2 and is a natural number greater than 2, and P is a natural number greater than or equal to 1. Any one of the parallel branches connects flat wire conductors of M·N/3P layers, and any one of the flat wire conductors in the any one of the parallel branches is connected to an in-phase flat wire conductor of an adjacent layer or a same layer in a winding slot at an adjacent span.

The stator in this embodiment may include the stator core and the stator winding. The stator core is provided with the M winding slots in which the flat wire conductors in the stator winding are inserted. N layers of flat wire conductors may be disposed in any one of the winding slots. When the stator winding is disposed, any phase winding includes P parallel branches, any one of the parallel branches connects flat wire conductors of M·N/3P layers, and any one of the flat wire conductors in the any one of the parallel branches is connected to an in-phase flat wire conductor of an adjacent layer or a same layer in a winding slot at an adjacent span. In this case, when a parallel branch is disposed, any flat wire conductor in the parallel branch is connected to an in-phase flat wire conductor of an adjacent layer or a same layer in a winding slot at an adjacent span. Therefore, starting from any one of the flat wire conductors in the parallel branch, after flat wire conductors from a first layer to an $N^{th}$ layer are traversed, connected flat wire conductors can surround the stator core for one circle, and so on. After M·N/3P flat wire conductors of different layers in different winding slots are continuously traversed in a similar connection mode, a parallel branch may be formed. In view of this, when one of the flat wire conductors is set to a wire-in end and another flat wire conductor at an adjacent span is set to a wire-out end, only the two flat wire conductors need to be disconnected. When the wire-in end and the wire-out end need to be changed, a flat wire conductor of an original wire-in end and a flat wire conductor of an original wire-out end may be connected, and only flat wire conductors on which a wire-in end and a wire-out end need to be set may be re-disconnected. Therefore, positions of the wire-in end and the wire-out end may be flexibly switched between a plug-wire end and a welding end. The stator may have a flexible winding structure. When a wire-in end and a wire-out end of a parallel branch need to be changed, only terminals may be simply connected based on an original connection structure, without changing a connection structure of flat wire conductors at other positions. Therefore, the stator may have wider applicability and may be adjusted and changed based on a package structure of the motor.

In a possible implementation, each phase winding may include two parallel branches. Because of this wiring mode, each parallel branch in each phase winding may have a completely balanced potential. Flat wire conductors may exist in a first layer to an $N^{th}$ layer of two parallel branches in each phase winding, and the potentials of the parallel branches are completely balanced, to avoid a cross current between the parallel branches.

In a possible implementation, a quantity of the winding slots may be 54. In a possible implementation, a quantity of layers of the flat wire conductors may be 6 or 10.

In a possible implementation, a span of any parallel branch in the first layer may be 9, and a combination of spans in the $N^{th}$ layer may be 10, 10, and 7, or 8, 8, and 11. In a possible implementation, a combination of spans of any parallel branch in the first layer may be 10, 10, and 7, or 8, 8, and 11, and a span in the $N^{th}$ layer may be 9. In a possible implementation, a span of any parallel branch from a second layer to an $(N-1)^{th}$ layer may be 9.

In a possible implementation, the wire-out end of any parallel branch may lead out from the flat wire conductor of the first layer or the flat wire conductor of the $N^{th}$ layer. In this structure, a wire-in end and a wire-out end of a parallel branch may conveniently lead out.

In a possible implementation, each phase winding may include a first parallel branch and a second parallel branch. A wire-in end of the first parallel branch is connected to a flat wire conductor of an $(n1)^{th}$ layer in an $(m1)^{th}$ winding slot, and a wire-out end of the first parallel branch is connected to a flat wire conductor of an $(n2)^{th}$ layer in an $(m2)^{th}$ winding slot. A difference between m1 and m2 is equal to a span. An absolute value of a difference between n1 and n2 is less than or equal to 1. A wire-in end of the second parallel branch is connected to a flat wire conductor of an $(n1+2)^{th}$ layer in the $(m1)^{th}$ winding slot, and a wire-out end of the second parallel branch is connected to a flat wire conductor of an $(n2+2)^{th}$ layer in the $(m2)^{th}$ winding slot, where m1 and m2 are natural numbers from 1 to M in a same phase winding, and n1 and n2 are natural numbers from 2 to N−2 in a same parallel branch. In the structure, positions of wire-in ends and wire-out ends of different parallel branches of a same phase winding are close to each other, so that the wire-in ends and the wire-out ends may lead out from flat wire conductors of different layers in a same winding slot, to facilitate connection.

In a possible implementation, the stator core may be provided with a wire-inlet end and a wire-outlet end, and head twisting directions of the stator winding are consistent at the wire-outlet end.

In a possible implementation, flat wire conductors of different layers in a same winding slot may belong to a same phase winding. In this structure, interphase insulating paper is not needed between flat wire conductors of different layers in a same winding slot, so that insulation costs of a motor may be reduced.

According to a second aspect, the embodiments may provide a flat wire motor. The flat wire motor includes a rotor and the stator according to the first aspect of this application. The rotor is disposed in a space enclosed by the inner wall of the stator core.

According to a third aspect, the embodiments may provide a powertrain. The powertrain includes a reducer and the flat wire motor according to the second aspect of this application. The flat wire motor is in transmission connection with the reducer.

According to a fourth aspect, the embodiments may provide a vehicle. The vehicle includes the powertrain according to the third aspect.

For effects that may be implemented in the second aspect and the fourth aspect, refer to corresponding effect descriptions in the first aspect. Details are not described herein again.

BRIEF DESCRIPTION OF THE DRAWINGS

FIG. 6 is a distribution diagram of phase belts of a stator winding according to an embodiment;

FIG. 19 is a distribution diagram of phase belts of a stator winding according to another embodiment;

DETAILED DESCRIPTION OF THE EMBODIMENTS

To make objectives, solutions, and advantages clearer, the following further describes the embodiments in detail with reference to the accompanying drawings.

Terms used in the following embodiments are merely intended to describe the embodiments but are not intended to limit the embodiments. The terms "one", "a" and "this" of singular forms used herein are also intended to include expressions such as "one or more", unless otherwise specified in the context clearly.

Reference to "an embodiment", "some embodiments", or the like indicates that one or more embodiments may include a feature, structure, or characteristic described with reference to the embodiment. Therefore, statements such as "in an embodiment", "in some embodiments", "in some other embodiments", and "in other embodiments", that appear at different places do not necessarily mean referring to a same embodiment, instead, they mean "one or more but not all of the embodiments", unless otherwise emphasized. The terms "include", "contain", "have", and their variants all mean "include but are not limited to", unless otherwise emphasized.

At present, a driving motor of a new energy vehicle is a permanent magnet synchronous motor. In the permanent magnet synchronous motor, a motor stator may use a circular wire conductor or a flat copper wire conductor based on a sectional shape of a stator winding. A motor using a flat copper wire conductor is referred to as a flat wire motor. The flat wire motor may effectively improve a wire slot fill, a power density, and a torque density. However, with an increasing quantity of flat wire conductors in a winding slot, a quantity of parallel circuits is increased. In addition, complexity of outgoing lines of parallel circuits may be increased. In an existing stator winding, parallel branches of the existing stator winding may make it difficult to switch positions of wire-in ends and wire-out ends of a plurality of parallel circuits between a plug-wire end and a welding end of the stator winding as required. Therefore, the existing stator winding has an inflexible connection structure and poor adaptability. To resolve the foregoing problems, an embodiment may provide a stator of a flat wire motor.

For ease of understanding, the following first describes proper nouns used in the embodiments.

A stator is a stationary part in a motor, and a function of the stator is to generate a rotating magnetic field.

A rotor is a rotating part in a motor, and a function of the rotor is to implement conversion between electric energy and mechanical energy.

A span, also referred to as a first pitch, is a distance that two edges of a same element in a motor winding span an armature surface and is usually represented by a quantity of winding slots formed on a stator core.

Figure 1:
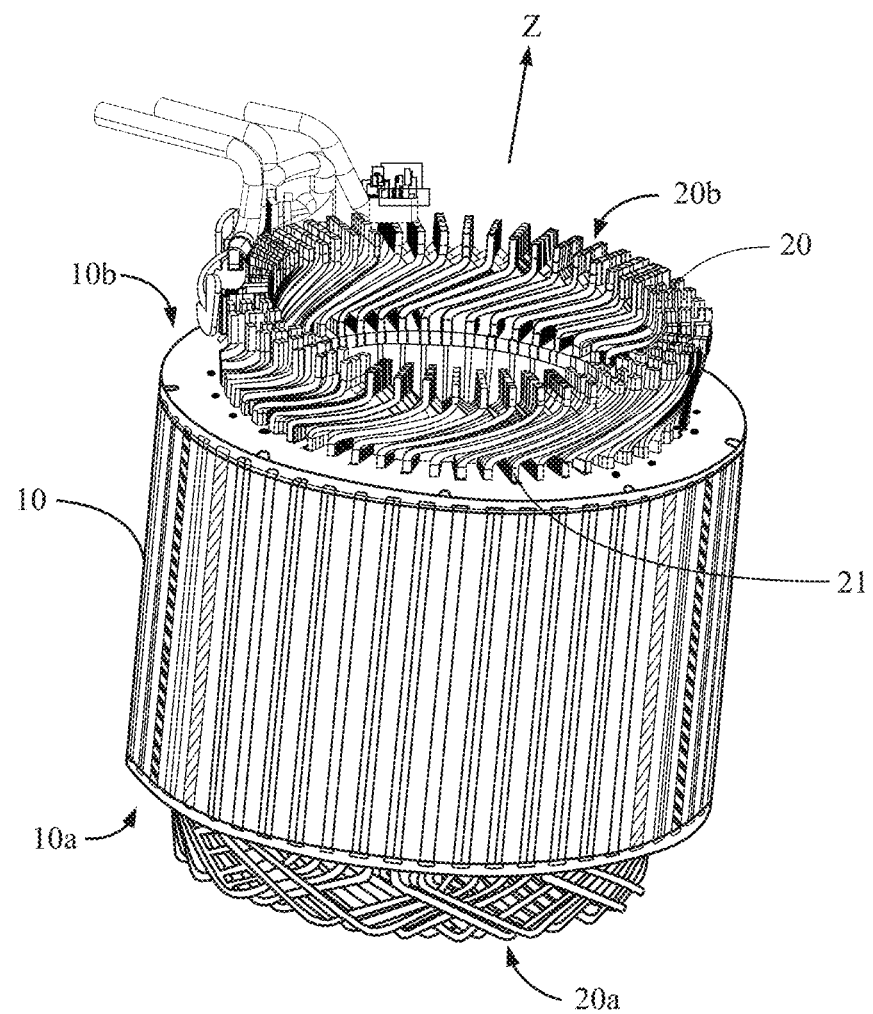
FIG. 1 is a schematic diagram of a three-dimensional structure of a stator of a flat wire motor according to an embodiment.
Figure 2:
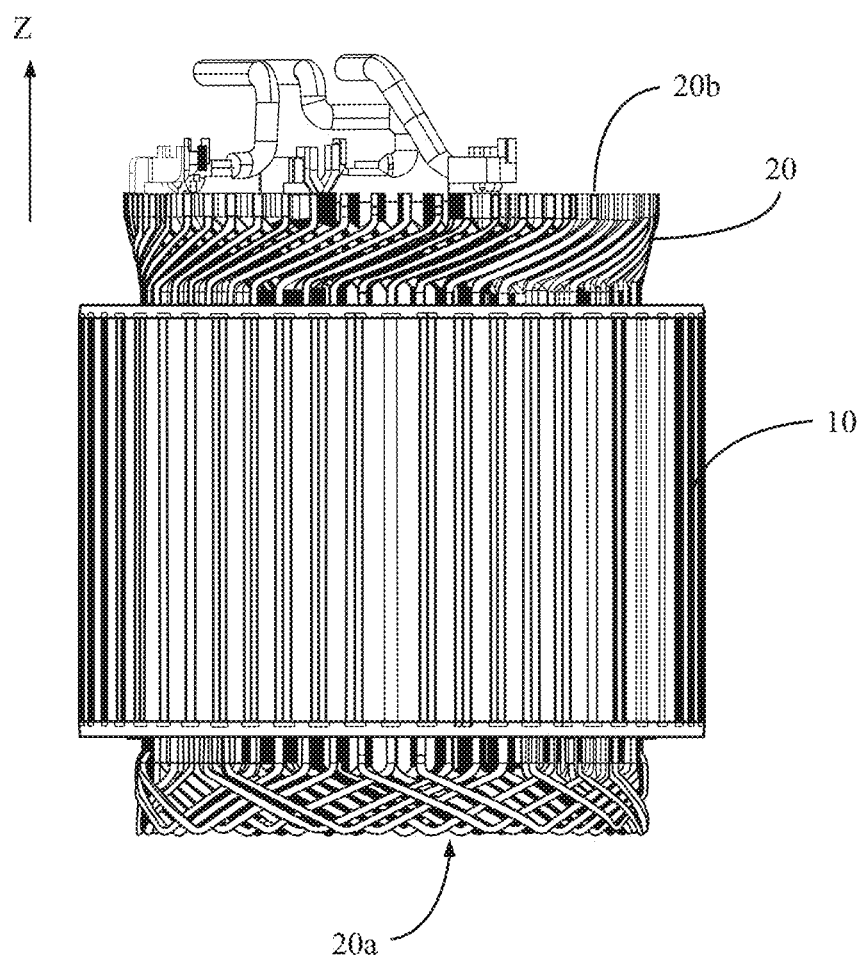
FIG. 2 is a side view of a structure of a stator of a flat wire motor according to an embodiment.

FIG. 1 is a schematic diagram of a three-dimensional structure of a stator of a flat wire motor according to an embodiment. FIG. 2 is a side view of a structure of a stator of a flat wire motor according to an embodiment. As shown in FIG. 1 and FIG. 2, in an embodiment, the stator includes a stator core 10 and a stator winding 20.

Figure 3:
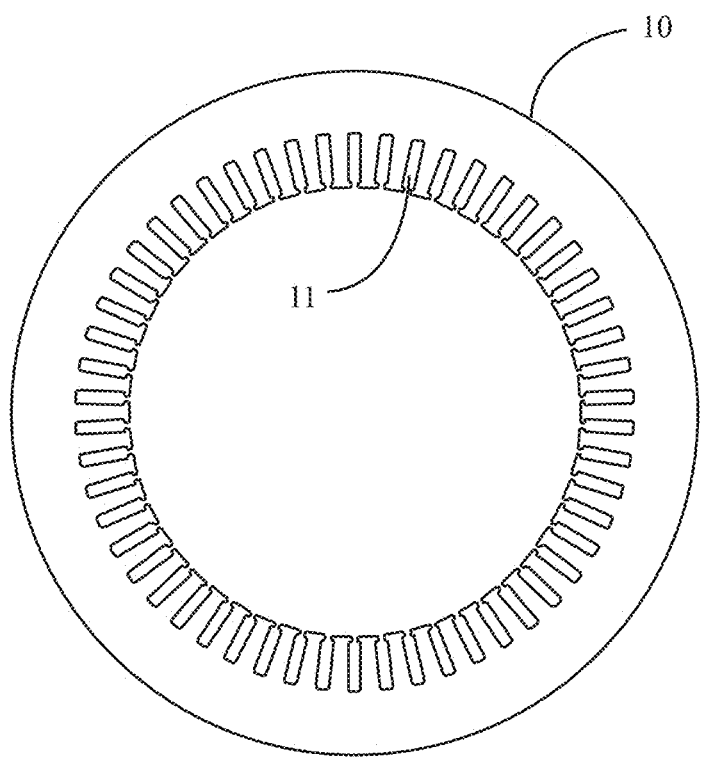
FIG. 3 is a top view of a structure of a stator core according to an embodiment.

FIG. 3 is a top view of a structure of a stator core according to an embodiment. As shown in FIG. 3, an inner wall of the stator core 10 is provided with a plurality of winding slots 11. A quantity of the winding slots 11 may be represented by M, where M may be a natural number that is a multiple of 3 and may be 54. Refer to FIG. 1 to FIG. 3. M winding slots 11 are disposed on the inner wall of the stator core 10 and are uniformly disposed in a circumferential direction of the inner wall of the stator core 10. Any one of the winding slots 11 extends in an axial direction (a Z direction shown in FIG. 1 and FIG. 2) of the stator core 10 and passes through the inner wall of the stator core 10 in the axial direction of the stator core 10. The stator core 10 has a wire-inlet end 10a and a wire-outlet end 10b in the axial direction of the stator core 10, and any one of the winding slots 11 may extend from the wire-inlet end 10a to the wire-outlet end 10b.

Figure 4:
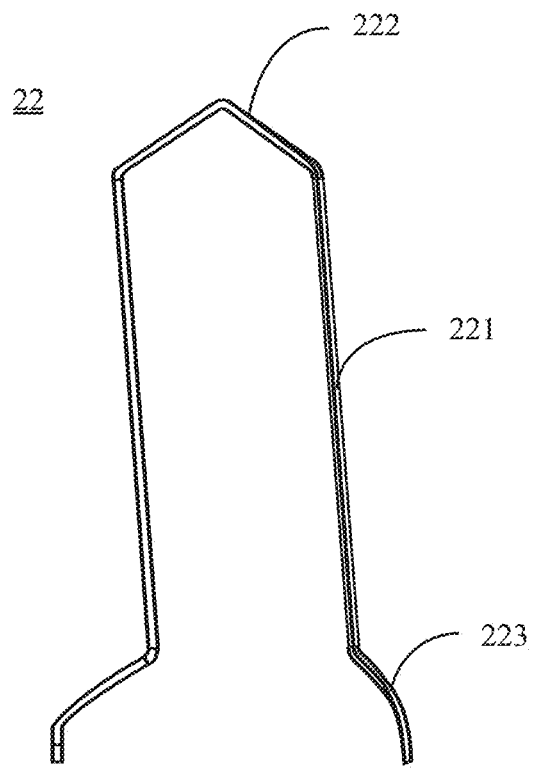
FIG. 4 is a schematic diagram of a structure of a hairpin coil according to an embodiment.

Refer to FIG. 1 and FIG. 2, in an embodiment, the stator winding 20 includes flat wire conductors 21 inserted in the winding slots 11, and cross sections of the flat wire conductors 21 may be rectangular. The flat wire conductors 21 may be formed by hairpin coils. FIG. 4 is a schematic diagram of a structure of a hairpin coil according to an embodiment. As shown in FIG. 4, in this embodiment, the hairpin coil 22 includes a leg 221 disposed in a winding slot 11, and a connected part 222 and a bent part 223 that are disposed outside the winding slot 11. The connected part 222 may be U-shaped or V-shaped. Refer to FIG. 1 and FIG. 4. In an embodiment, after the hairpin coil 22 is inserted in the winding slot 11, the hairpin coil 22 may be bent to form the bent part 223. After insertion, the leg 221, inserted in the winding slot 11, of the hairpin coil 22 forms the flat wire conductor 21. After bending, head twisting directions of the bent part 223 of the hairpin coil 22 are consistent. After the hairpin coil 22 is inserted in the winding slot 11, the connected part 222 forms the plug-wire end 20a of the stator winding 20, and the bent part 223 forms the welding end 20b of the stator winding 20.

Figure 5:
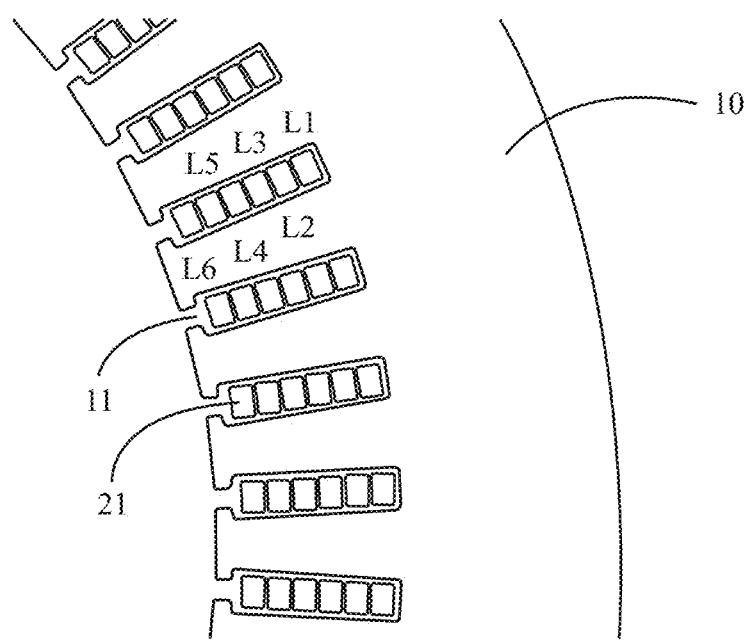
FIG. 5 is a top view of a structure of a flat wire conductor that is inserted in a winding slot according to an embodiment.

FIG. 5 is a top view of a structure of a flat wire conductor that is inserted in a winding slot according to an embodiment. As shown in FIG. 5, in an embodiment, N layers of flat wire conductors 21 may be disposed in any winding slot 11, where N may be 6 or 10. As shown in FIG. 5, in this embodiment, N is 6. That is, six layers of flat wire conductors are disposed in each winding slot 11. It may be understood that a quantity of layers of the flat wire conductors 21 shown in FIG. 5 is only described as an example. Six or ten layers of flat wire conductors 21 may be disposed.

Figure 6:
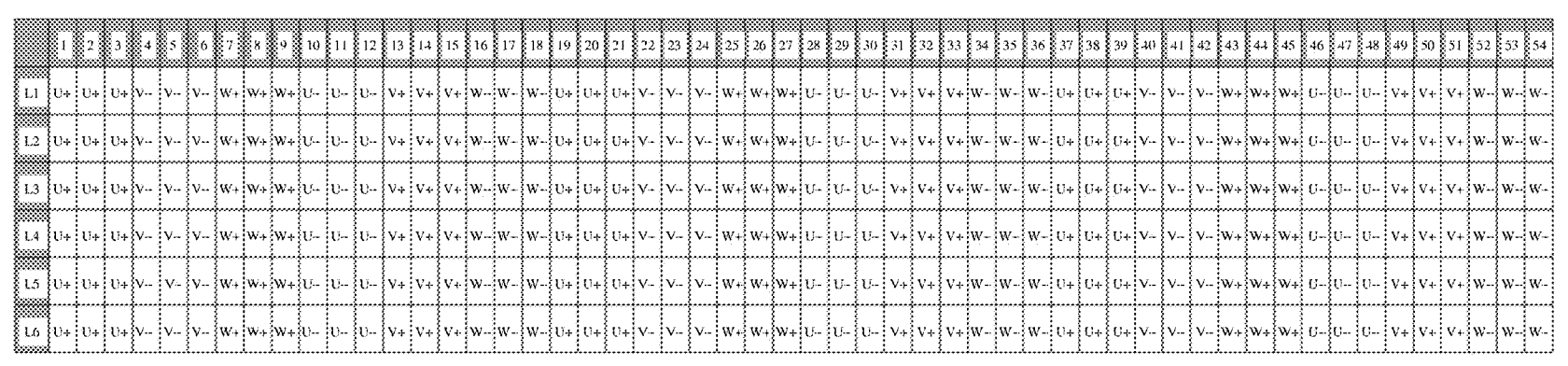

Still refer to FIG. 1 and FIG. 5. In an embodiment, the flat wire conductors 21 inserted in the winding slots 11 are grouped and connected to form three phase windings. The three phase windings are a first-phase winding, a second-phase winding, and a third-phase winding, and respectively correspond to a U-phase winding, a V-phase winding, and a W-phase winding. Any one of the three phase windings may include a plurality of phase units. When the three phase windings are connected, phase units of the first-phase winding, phase units of the second-phase winding, and phase units of the third-phase winding are sequentially and periodically arranged along the inner wall of the stator core. FIG. 6 is a distribution diagram of phase belts of a stator winding according to an embodiment. Refer to FIG. 5 and FIG. 6. In an embodiment, three winding slots 11 that are adjacently disposed form one phase unit, and in one phase unit, all flat wire conductors 21 are in-phase. The U-phase winding, the V-phase winding, and the W-phase winding are alternately disposed based on phase units. Refer to FIG. 5 and FIG. 6. In an embodiment, the flat wire conductors 21 in a same winding slot 11 are in-phase. In this case, interphase insulating paper is not needed for the flat wire conductors 21 of different layers in the same winding slots 11, so that insulation costs of a motor may be reduced.

Figure 7:
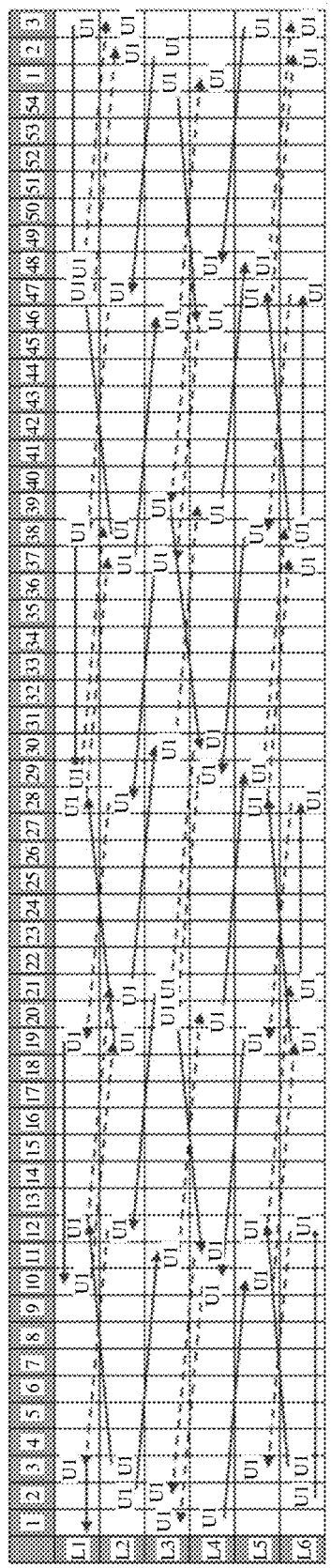
FIG. 7 is a schematic diagram of a connection mode of a parallel branch according to an embodiment.
Figure 8:
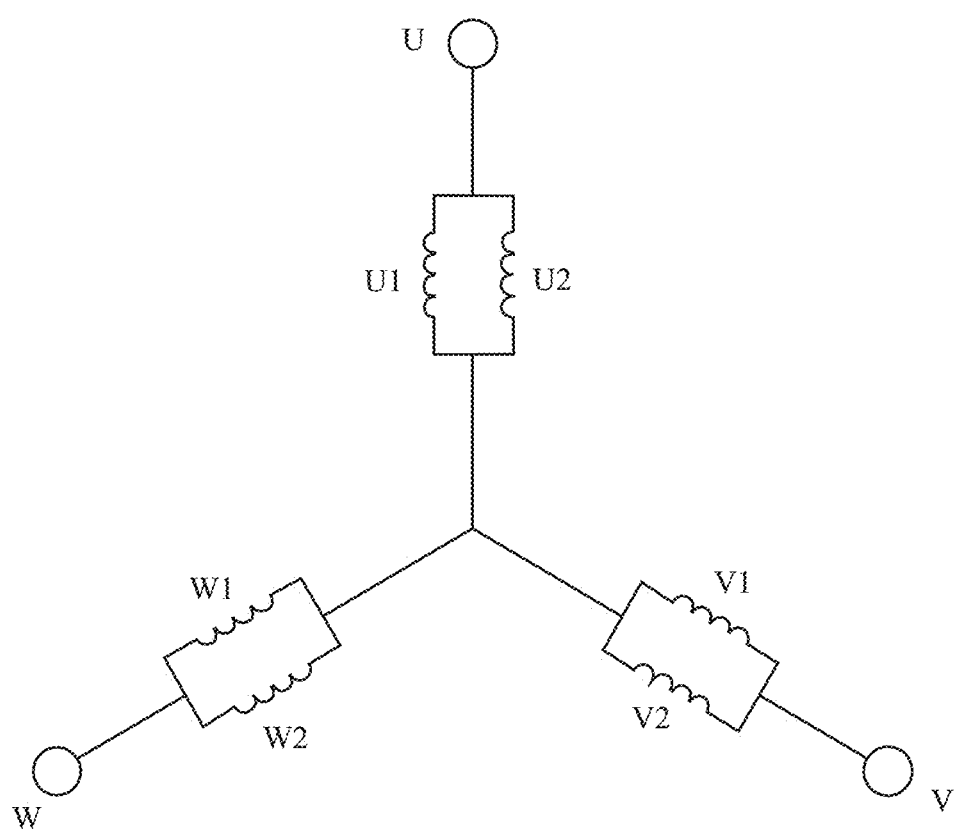
FIG. 8 is a schematic diagram of a circuit connection of three phase windings according to an embodiment.

FIG. 7 is a schematic diagram of a connection mode of flat wire conductors for forming a parallel branch according to an embodiment. Refer to FIG. 5 and FIG. 7. In an embodiment, each phase winding may include two parallel branches. Any one of the parallel branches may connect flat wire conductors 21 of M·N/3P layers, and any one of the flat wire conductors 21 in the any one of the parallel branches is connected to an in-phase flat wire conductor 21 of an adjacent layer or a same layer in a winding slot 11 at an adjacent span. FIG. 8 is a schematic diagram of a circuit connection of three phase windings according to an embodiment. As shown in FIG. 8, in this embodiment, the three phase windings of a stator winding each include two parallel circuits.

Still refer to FIG. 7. In an embodiment, a span of any parallel branch in a first layer is 9, and a combination of spans in an $N^{th}$ layer is 10, 10, and 7, or 8, 8, and 11. In a possible implementation, a combination of spans of any one of the parallel branches in the first layer is 10, 10, and 7, or 8, 8, and 11, and a span in the $N^{th}$ layer is 9. In a possible implementation, a span of any parallel branch from a second layer to an $(N-1)^{th}$ layer is 9.

In a possible implementation, a wire-out end of any one of the parallel branches leads out from a flat wire conductor of the first layer or a flat wire conductor of the $N^{th}$ layer. In this structure, a wire-in end and a wire-out end of a parallel branch can conveniently lead out.

In another possible implementation, each phase winding includes a first parallel branch and a second parallel branch. A wire-in end of the first parallel branch is connected to a flat wire conductor of an $(n1)^{th}$ layer in an $(m1)^{th}$ winding slot, and a wire-out end of the first parallel branch is connected to a flat wire conductor of an $(n2)^{th}$ layer in an $(m2)^{th}$ winding slot. A difference between m1 and m2 is equal to a span. An absolute value of a difference between n1 and n2 is less than or equal to 1. An wire-in end of the second parallel branch is connected to a flat wire conductor of an $(n1+2)^{th}$ layer in the $(m1)^{th}$ winding slot, and a wire-out end of the second parallel branch is connected to a flat wire conductor of an $(n2+2)^{th}$ layer in the $(m2)^{th}$ winding slot, where m1 and m2 are natural numbers from 1 to M in a same phase winding, and n1 and n2 are natural numbers from 2 to N−2 in a same parallel branch. In the structure, positions of wire-in ends and wire-out ends of different parallel branches of a same phase winding are close to each other, so that the wire-in ends and the wire-out ends may lead out from flat wire conductors of different layers in a same winding slot, to facilitate connection.

An embodiment further provides a flat wire motor. The flat wire motor includes a rotor and the stator according to embodiments. The rotor is disposed in a space enclosed by an inner wall of the stator core.

An embodiment further provides a powertrain. The powertrain includes a reducer and the foregoing flat wire motor. The flat wire motor is in transmission connection with the reducer. A drive shaft of the flat wire motor may be in transmission connection with an input shaft of the reducer through a transmission part, for example, a coupling, to output a driving force from the flat wire motor to the reducer.

An embodiment provides a vehicle. The vehicle includes the foregoing powertrain. The powertrain is disposed in the vehicle and provides running power for the vehicle. In this embodiment, the vehicle may be a new energy vehicle driven by electric energy. The new energy vehicle may be a hybrid electric vehicle, a battery electric vehicle, a fuel cell electric vehicle, or the like, or may be a vehicle using an efficient accumulator, for example, a supercapacitor, a flywheel battery, or a flywheel accumulator as a source of electric energy.

The following describes in detail a connection mode of a parallel branch in the embodiments.

Embodiment 1

Figure 9:
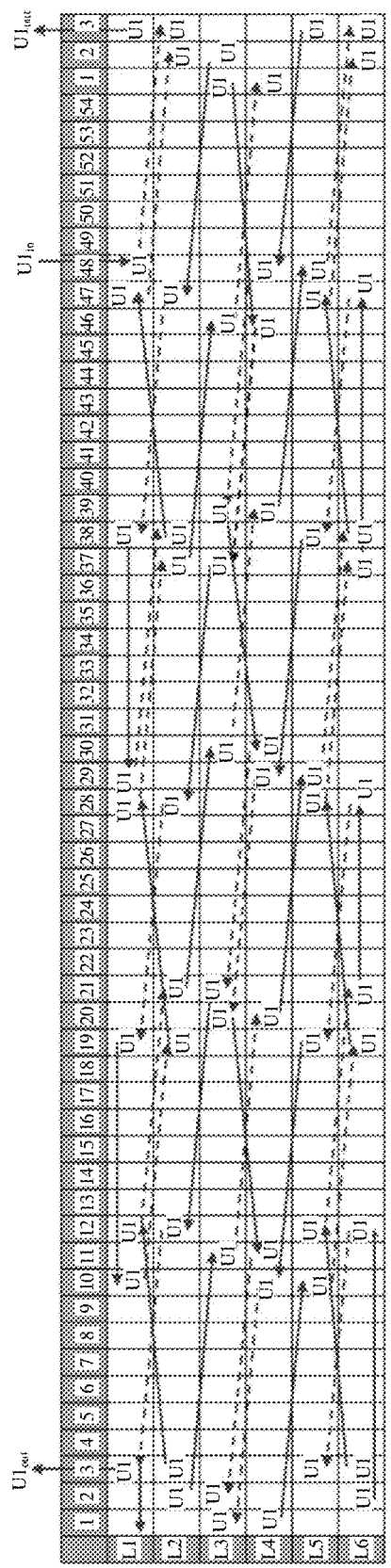
FIG. 9 is a schematic diagram of a connection of a first parallel branch of a U-phase winding according to an embodiment.
Figure 10:
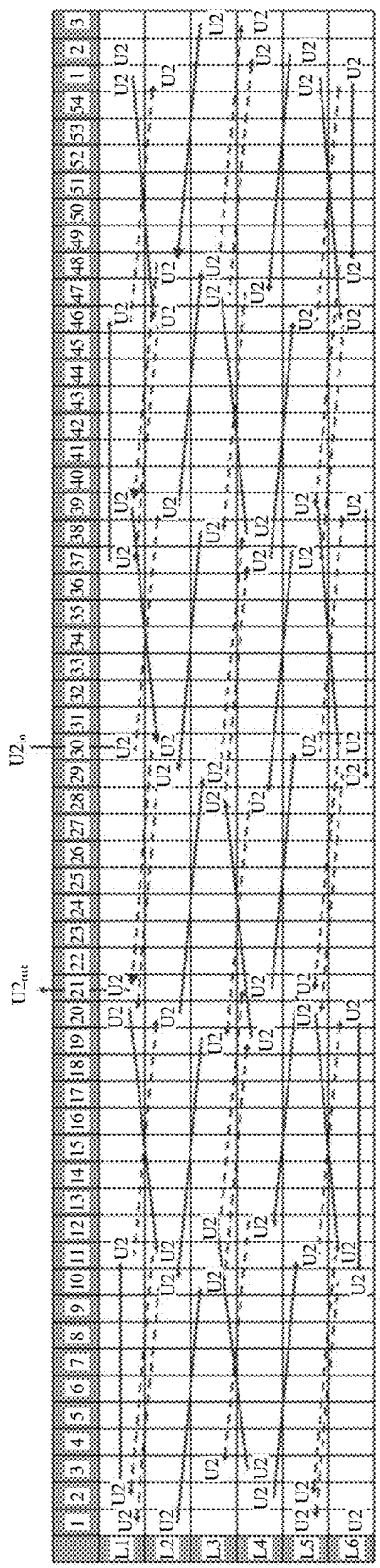
FIG. 10 is a schematic diagram of a connection of a second parallel branch of a U-phase winding according to an embodiment.

This embodiment provides a stator of a flat wire motor. The stator includes a stator core and a stator winding. The stator core has 54 winding slots, and a quantity of layers of conductors in each winding slot is 6. The stator winding includes a U-phase winding, a V-phase winding, and a W-phase winding. Each phase winding has two parallel branches. For a distribution diagram of phase belts of the stator winding in this embodiment, refer to FIG. 6. FIG. 9 is a schematic diagram of a connection of a first parallel branch of the U-phase winding in this embodiment. FIG. 10 is a schematic diagram of a connection of a second parallel branch of the U-phase winding in this embodiment. In this embodiment, wire-in ends and wire-out ends of the first parallel branch and the second parallel branch of each phase winding are connected to a flat wire conductor of a first layer.

As shown in FIG. 6, each winding slot has flat wire conductors of six layers. The first layer is denoted as L1, a second layer is denoted as L2, a third layer is denoted as L3, a fourth layer is denoted as L4, a fifth layer is denoted as L5, and a sixth layer is denoted as L6. The first layer is a bottom layer of the winding slot, and the sixth layer is a top layer of the winding slot. "+" represents a current flowing into a conductor and "—" represents a current flowing out of a conductor. It should be noted that distribution of the phase belts in FIG. 6 is only described as an example. Symbols "+" and "—" in FIG. 6 are exchanged, for example, replacing symbols "U$^+$" with "U$^-$", replacing symbols "U$^-$" with "U$^+$", and modifying a V phase and a W phase correspondingly are all within the scope.

In FIG. 9 and FIG. 10, a solid line represents a wiring mode of a plug-wire end, and a dotted line represents a wiring mode of a welding end.

The following describes in detail a wiring mode of the first parallel branch of the U-phase winding in this embodiment with reference to FIG. 9. The following describes a wiring mode of the stator winding at the welding end only based on the connection mode represented by the dotted line in FIG. 9. A connecting wire at the plug-wire end of the stator winding may be directly connected through a connected part of a hairpin coil. For details, refer to the connection mode represented by the solid line in FIG. 9.

Refer to FIG. 9. In the first parallel branch of the U-phase winding, a first layer in a $48^{th}$ slot is used as a wire-in end $U_{1in}$. The first parallel branch enters from the first layer in the $48^{th}$ slot and leads out from a second layer in a third slot, then enters from a first layer in a $12^{th}$ slot and leads out from a second layer in a $21^{st}$ slot, then enters from a third layer in a $30^{th}$ slot and leads out from a fourth layer in a $39^{th}$ slot, then enters from a fifth layer in the $48^{th}$ slot and leads out from a sixth layer in the third slot, and then enters from a fifth layer in the $12^{th}$ slot and leads out from a sixth layer in the $21^{st}$ slot. In this case, after flat wire conductors are connected, the first parallel branch may traverse from a first layer to a sixth layer and may be circumferentially disposed around the stator core for one circle. The first parallel branch performs a next traversal according to the foregoing method. The first parallel branch enters from a sixth layer in a $28^{th}$ slot and leads out from a fifth layer in a $19^{th}$ slot, then enters a fourth layer in a $10^{th}$ slot and leads out from a third layer in a first slot, then enters a fourth layer in a $46^{th}$ slot and leads out from a third layer in a $37^{th}$ slot, and then enters from a second layer in the $28^{th}$ slot and leads out from a first layer in the $19^{th}$ slot, and in this case, the first parallel branch completes a second traversal. Then, the first parallel branch enters from a first layer in the $10^{th}$ slot and leads out from a second layer in the $19^{th}$ slot, then enters from a first layer in the $28^{th}$ slot and leads out from a second layer in the $37^{th}$ slot, then enters from a third layer in the $46^{th}$ slot and leads out from a fourth layer in the first slot, then enters from a fifth layer in the $10^{th}$ slot and leads out from a sixth layer in the $19^{th}$ slot, and then enters from a fifth layer in the $28^{th}$ slot and leads out from a sixth layer in the $37^{th}$ slot, and in this case, the first parallel branch completes a third traversal. Then, the first parallel branch enters from a sixth layer in a $47^{th}$ slot and leads out from a fifth layer in a $38^{th}$ slot, then enters from a fourth layer in a $29^{th}$ slot and leads out from a third layer in a $20^{th}$ slot, then enters from a fourth layer in an $11^{th}$ slot and leads out from a third layer in a second slot, and then enters from a second layer in the 47$^{th}$ slot and leads out from a first layer in the 38$^{th}$ slot, and in this case, the first parallel branch completes a fourth traversal. Then, the first parallel branch enters from a first layer in the 29$^{th}$ slot and leads out from a second layer in the 38$^{th}$ slot, then enters from a first layer in the 47$^{th}$ slot and leads out from a second layer in the second slot, then enters from a third layer in the 11$^{th}$ slot and leads out from a fourth layer in the 20$^{th}$ slot, then enters from a fifth layer in the 29$^{th}$ slot and leads out from a sixth layer in the 38$^{th}$ slot, and then enters from a fifth layer in the 47$^{th}$ slot and leads out from a sixth layer in the second slot, and in this case, the first parallel branch completes a fifth traversal. Then, the first parallel branch enters from a sixth layer in the 12$^{th}$ slot and leads out from a fifth layer in the third slot, then enters from a fourth layer in the 48$^{th}$ slot and leads out from a third layer in the 39$^{th}$ slot, then enters from a fourth layer in the 30$^{th}$ slot and leads out from a third layer in the 21$^{st}$ slot, and then enters from a second layer in the 12$^{th}$ slot and leads out from a first layer in the third slot, and in this case, the first parallel branch leads out from the first layer in the third slot, to form a wire-out end U$_{1out}$ of the first parallel branch of the U-phase winding.

It should be noted that in the foregoing connection mode, for example, that "the first parallel branch enters from the first layer in the 48$^{th}$ slot and leads out from the second layer in the third slot" means that at the welding end, the flat wire conductor of the first layer in the 48$^{th}$ slot is connected to the flat wire conductor of the second layer in the third slot.

The following describes in detail a wiring mode of the second parallel branch of the U-phase winding in this embodiment with reference to FIG. 10. The following describes a wiring mode of the stator winding at the welding end only based on the connection mode represented by the dotted line in FIG. 10. A connecting wire at the plug-wire end of the stator winding may be directly connected through a connected part of a hairpin coil. For details, refer to the connection mode represented by the solid line in FIG. 10.

Refer to FIG. 10. In the second parallel branch of the U-phase winding, a first layer in the 30$^{th}$ slot is used as a wire-in end U$_{2in}$. The second parallel branch enters from the first layer in the 30$^{th}$ slot and leads out from a second layer in the 39$^{th}$ slot, then enters from a third layer in the 48$^{th}$ slot and leads out from a fourth layer in the third slot, then enters from a third layer in the 12$^{th}$ slot and leads out from a fourth layer in the 21$^{st}$ slot, and then enters from a fifth layer in the 30$^{th}$ slot and leads out from a sixth layer in the 39$^{th}$ slot, and in this case, the second parallel branch completes a first traversal. Then, the second parallel branch enters from a sixth layer in the 29$^{th}$ slot and leads out from a fifth layer in the 20$^{th}$ slot, then enters from a sixth layer in the 11$^{th}$ slot and leads out from a fifth layer in the second slot, then enters from a fourth layer in the 47$^{th}$ slot and leads out from a third layer in the 38$^{th}$ slot, then enters from a second layer in the 29$^{th}$ slot and leads out from a first layer in the 20$^{th}$ slot, and then enters from a second layer in the 11$^{th}$ slot and leads out from a first layer in the second slot, and in this case, the second parallel branch completes a second traversal. Then, the second parallel branch enters from a first layer in the 11$^{th}$ slot and leads out from a second layer in the 20$^{th}$ slot, then enters from a third layer in the 29$^{th}$ slot and leads out from a fourth layer in the 38$^{th}$ slot, then enters from a third layer in the 47$^{th}$ slot and leads out from a fourth layer in the second slot, and then enters from a fifth layer in the 11$^{th}$ slot and leads out from a sixth layer in the 20$^{th}$ slot, and in this case, the second parallel branch completes a third traversal. Then, the second parallel branch enters from a sixth layer in the 10$^{th}$ slot and leads out from a fifth layer in the first slot, then enters from a sixth layer in the 46$^{th}$ slot and leads out from a fifth layer in the 37$^{th}$ slot, then enters from a fourth layer in the 28$^{th}$ slot and leads out from a third layer in the 19$^{th}$ slot, then enters from a second layer in the 10$^{th}$ slot and leads out from a first layer in the first slot, and then enters from a second layer in the 46$^{th}$ slot and leads out from a first layer in the 37$^{th}$ slot, and in this case, the second parallel branch completes a fourth traversal. Then, the second parallel branch enters from a first layer in the 46$^{th}$ slot and leads out from a second layer in the first slot, then enters from a third layer in the 10$^{th}$ slot and leads out from a fourth layer in the 19$^{th}$ slot, then enters from a third layer in the 28$^{th}$ slot and leads out from a fourth layer in the 37$^{th}$ slot, and then enters from a fifth layer in the 46$^{th}$ slot and leads out from a sixth layer in the first slot, and in this case, the second parallel branch completes a fifth traversal. Then, the second parallel branch enters from a sixth layer in the 47$^{th}$ slot and leads out from a fifth layer in the 39$^{th}$ slot, then enters from a sixth layer in the 30$^{th}$ slot and leads out from a fifth layer in the 21$^{st}$ slot, then enters from a fourth layer in the 12$^{th}$ slot and leads out from a third layer in the third slot, then enters from a second layer in the 48$^{th}$ slot and leads out from a first layer in the 39$^{th}$ slot, and then enters from a second layer in the 30$^{th}$ slot and leads out from a first layer in the 21$^{st}$ layer. In this case, the second parallel branch leads out from the first layer in the 21$^{st}$ layer, to form a wire-out end U$_{2out}$ in the second parallel branch of the U-phase winding.

In the foregoing wiring mode, for example, that "the second parallel branch enters from the first layer in the 30$^{th}$ slot and leads out from the second layer in the 39$^{th}$ slot" may be understood with reference to relevant explanations in the wiring mode in FIG. 9. Details are not described herein again.

As shown in FIG. 6, FIG. 9, and FIG. 10, in this embodiment, a combination of spans in the first layer in the first parallel branch is 9 and 9, a combination of spans in the sixth layer is 10, 10, and 7, and each of spans between every adjacent two layers from the second layer to the fifth layer is 9. U1in, U1out, U2 in, and U2out each lead out from the plug-wire end of the stator winding, that is, lead out from a side of the connected part of the hairpin coil. In this case, a connected part between U1in and U1out is disconnected, and U1in and U1out separately lead out by using a conducting wire. A connected part between U2in and U2out is disconnected, and U2in and U2out separately lead out by using a conducting wire. In this structure, spans of most flat wire conductors are the same. Therefore, when the stator winding is wound, hairpin coils of a same model may be used, so that a quantity of models of hairpin coils is reduced and automatic insertion is facilitated. In addition, spans of parallel branches are the same at the welding end, to facilitate connection.

A wiring mode of a first parallel branch of the V-phase winding and a wiring mode of a first parallel branch of the W-phase winding may be obtained through translation on the basis of FIG. 9. A wiring mode of a second parallel branch of the V-phase winding and a wiring mode of a second parallel branch of the W-phase winding may be obtained through translation on the basis of FIG. 10.

In this case, a wire-in end and a wire-out end of each of a first parallel branch and a second parallel branch of each phase winding are located on a first layer. The three phase windings may directly lead out in parallel or may be connected by using busbars to lead out. Neutral points may be welded directly or connected together by using busbars.

In addition, in the foregoing wiring modes, each parallel branch traverses phase belts and flat wire conductor layers that can be arranged, so that each parallel branch can maintain a potential balance, and no cross current is generated. It can be understood from FIG. 6, FIG. 9, and FIG. 10, conductors in a same slot are in-phase. In this case, insulating paper is not needed between flat wire conductors, to reduce insulation costs.

Embodiment 2

Figure 11:
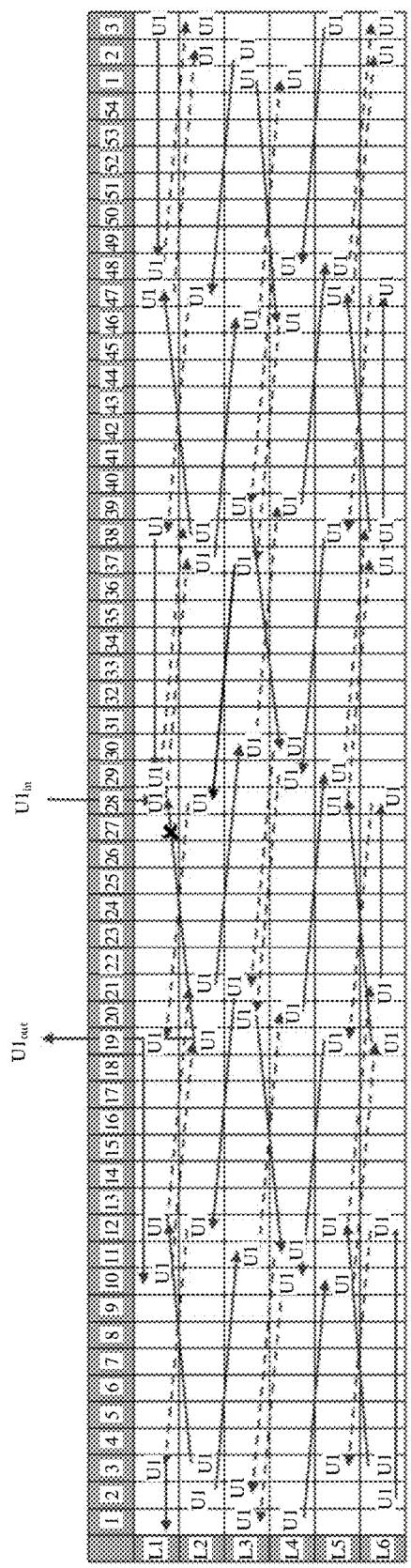
FIG. 11 is a schematic diagram of a connection of a first parallel branch of a U-phase winding according to another embodiment.
Figure 12:
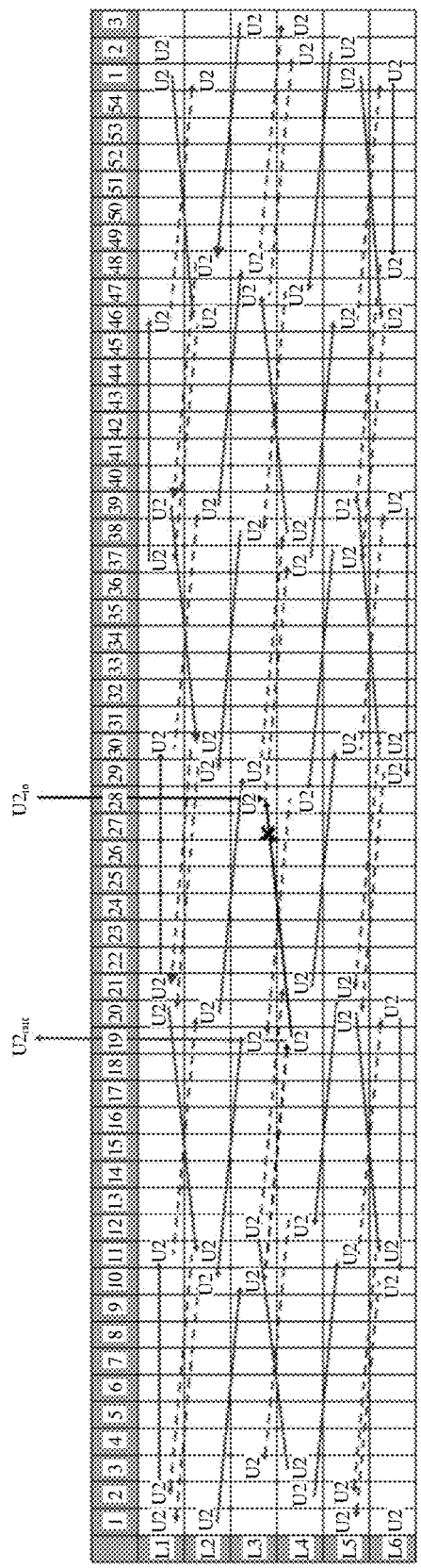
FIG. 12 is a schematic diagram of a connection of a second parallel branch of a U-phase winding according to another embodiment.

This embodiment provides a stator. FIG. 11 is a schematic diagram of a connection of a first parallel branch of a U-phase winding in this embodiment. FIG. 12 is a schematic diagram of a connection of a second parallel branch of a U-phase winding in this embodiment.

Refer to FIG. 11 and FIG. 12. In comparison with Embodiment 1, positions of wire-in ends and wire-out ends of a first parallel branch and a second parallel branch of each phase winding are different from those in Embodiment 1.

As shown in FIG. 11, in this embodiment, a wire-in end U1in of the first parallel branch is a first layer in a $28^{th}$ slot, and a wire-out end U1out of the first parallel branch is a second layer in a $19^{th}$ slot. Based on Embodiment 1, the original flat wire conductor of the first layer in the $48^{th}$ slot and the original flat wire conductor of the first layer in the third slot are connected to the plug-wire end of the stator winding, a connected part between the flat wire conductor of the first layer in the $28^{th}$ slot and the flat wire conductor of the second layer in the $19^{th}$ slot is disconnected at the plug-wire end of the stator winding, and then, the flat wire conductor of the first layer in the $28^{th}$ slot and the flat wire conductor of the second layer in the $19^{th}$ slot separately lead out by using a leading wire. A wiring mode of a flat wire conductor in another position may not be changed. In this connection mode, a combination of spans in the first layer is 9, 9, and 9, and a combination of spans in the sixth layer is 10, 10, and 7.

As shown in FIG. 12, in this embodiment, the wire-in end U2in of the second parallel branch is a third layer in the $28^{th}$ slot, and the wire-out end U2out is a fourth layer in the $19^{th}$ slot. Based on Embodiment 1, the original flat wire conductor of the first layer in the $30^{th}$ slot and the flat wire conductor of the first layer in the $21^{st}$ slot are connected at the plug-wire end of the stator winding, the connected part between a flat wire conductor of the third layer in the $28^{th}$ slot and a flat wire conductor of the fourth layer in the $19^{th}$ slot is disconnected at the plug-wire end of the stator winding, and then, the flat wire conductor of the third layer in the $28^{th}$ slot and the flat wire conductor of the fourth layer in the $19^{th}$ slot separately lead out by using a leading wire. A wiring mode of a flat wire conductor in another position may not be changed.

It can be understood from a comparison between Embodiment 1 and Embodiment 2 that when a wire-in end and a wire-out end of each parallel branch are not all disposed at the first layer, wire-in ends of two in-phase parallel branches may be disposed in a same winding slot and wire-out ends of two in-phase parallel branches may be disposed in another same winding slot at an adjacent span. Therefore, a leading wire distance between parallel branches may be effectively reduced, a wire-in end and a wire-out end of each parallel branch of the three phase windings may conveniently lead out in parallel or lead out after being connected by using a busbar, and lead-out distances are short.

Embodiment 3

Figure 13:
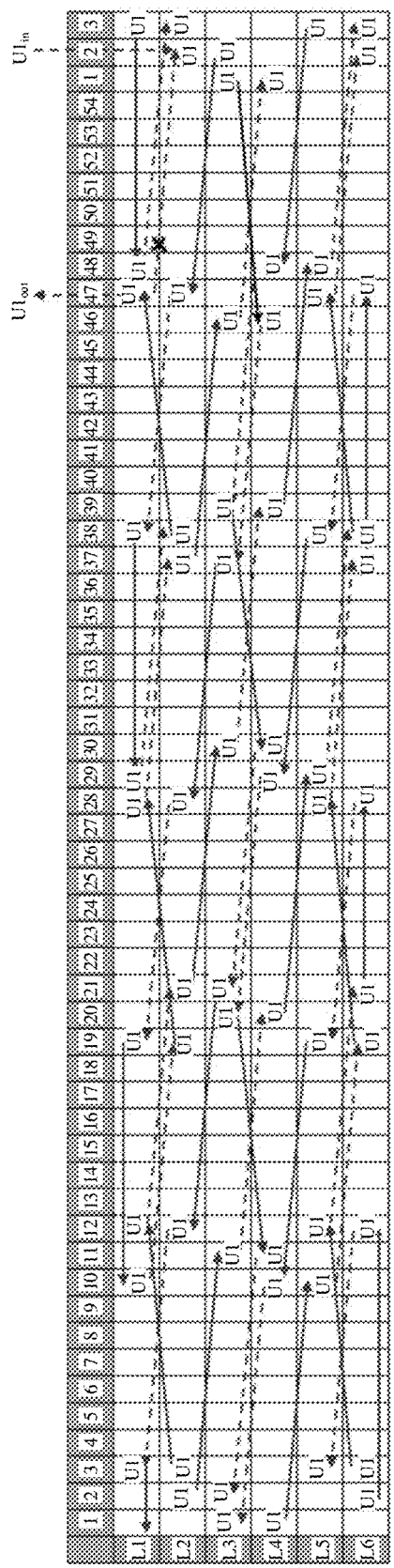
FIG. 13 is a schematic diagram of a connection of a first parallel branch of a U-phase winding according to still another embodiment.
Figure 14:
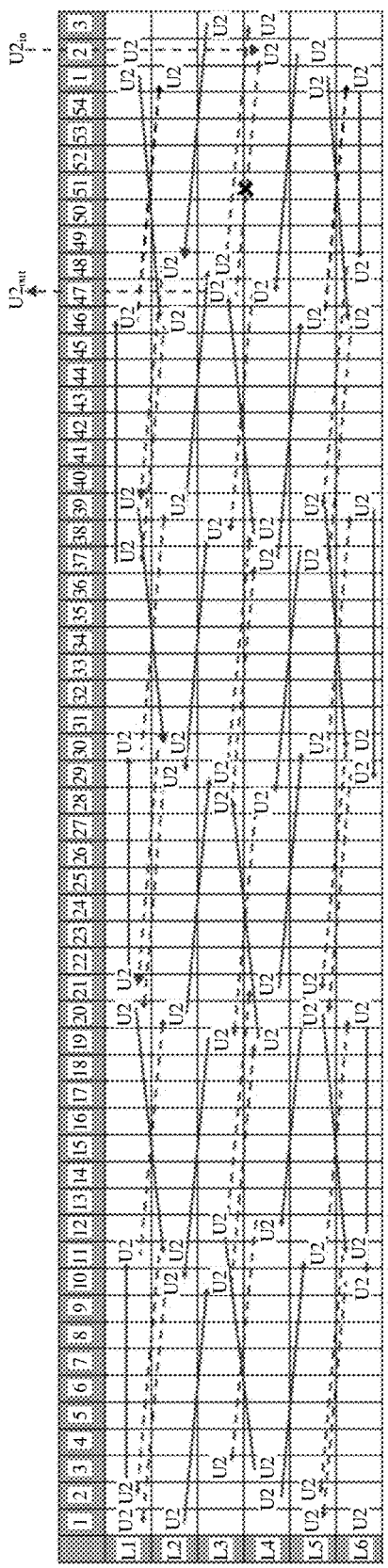
FIG. 14 is a schematic diagram of a connection of a second parallel branch of a U-phase winding according to still another embodiment.

This embodiment provides a stator. FIG. 13 is a schematic diagram of a connection of a first parallel branch of a U-phase winding in this embodiment. FIG. 14 is a schematic diagram of a connection of a second parallel branch of a U-phase winding in this embodiment.

Refer to FIG. 13 and FIG. 14. In comparison with Embodiment 1, positions of a wire-in end and a wire-out end of each of a first parallel branch and a second parallel branch of each phase are different from those in Embodiment 1. In addition, in this embodiment, both the wire-in end and the wire-out end of each parallel branch are disposed at a welding end of a stator winding.

As shown in FIG. 13, in this embodiment, a wire-in end U1in of the first parallel branch is a second layer in a second slot, and a wire-out end U1out is a first layer in a $47^{th}$ slot. Based on Embodiment 1 (refer to the wiring mode shown in FIG. 9), the original flat wire conductor of the first layer in the $48^{th}$ slot and the original flat wire conductor of the first layer in the third slot are connected at the plug-wire end of the stator winding, the bent part between the flat wire conductor of the second layer in the second slot and the flat wire conductor of the first layer in the $47^{th}$ slot is disconnected at the welding end of the stator winding, and then, the flat wire conductor of the second layer in the second slot and the flat wire conductor of the first layer in the $47^{th}$ slot separately lead out by using a leading wire. A wiring mode of a flat wire conductor in another position may not be changed.

As shown in FIG. 14, in this embodiment, the wire-in end U2in of the second parallel branch is a fourth layer in the second slot, and the wire-out end U2out is a third layer in the $47^{th}$ slot. Based on Embodiment 1 (refer to the wiring mode shown in FIG. 10), the original flat wire conductor of the first layer in the $30^{th}$ slot and the flat wire conductor of the first layer in the $21^{st}$ slot are connected at the plug-wire end of the stator winding, the connected part between the flat wire conductor of the fourth layer in the second slot and the flat wire conductor of the third layer in the $47^{th}$ slot is disconnected at the plug-wire end of the stator winding, and then, the flat wire conductor of the fourth layer in the second slot and the flat wire conductor of the third layer in the $47^{th}$ slot separately lead out by using a leading wire. A wiring mode of a flat wire conductor in another position may not be changed.

Compared with Embodiment 1, the wire-in end and the wire-out end of each parallel branch in Embodiment 3 are switched from the plug-wire end of the stator winding to the welding end of the stator winding. The switching form is simple and easy, and positions of the wire-in end and the wire-out end may be flexibly selected. In Embodiment 3, by using this wiring mode, wire-in ends of two parallel branches are located in a same winding slot, wire-out ends are located in a same winding slot. Therefore, a connection distance may be smaller.

Figure 15:
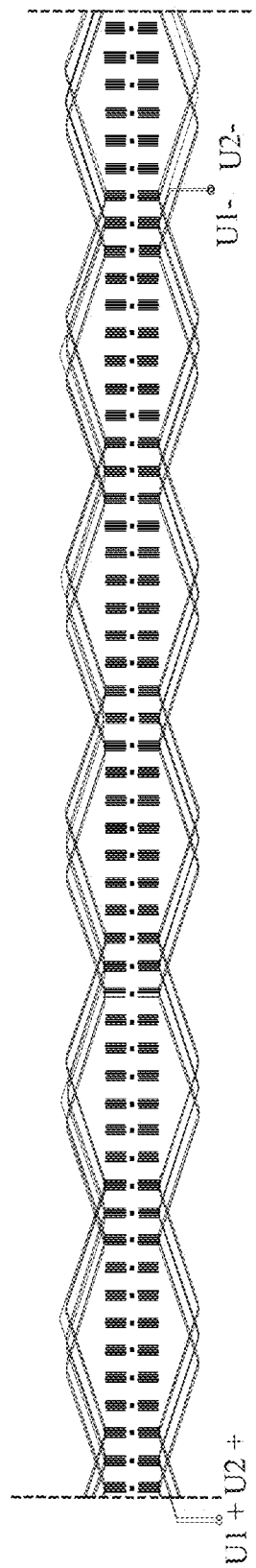
FIG. 15 is a schematic diagram of a connection of two parallel branches of a U-phase winding according to still another embodiment.
Figure 16:
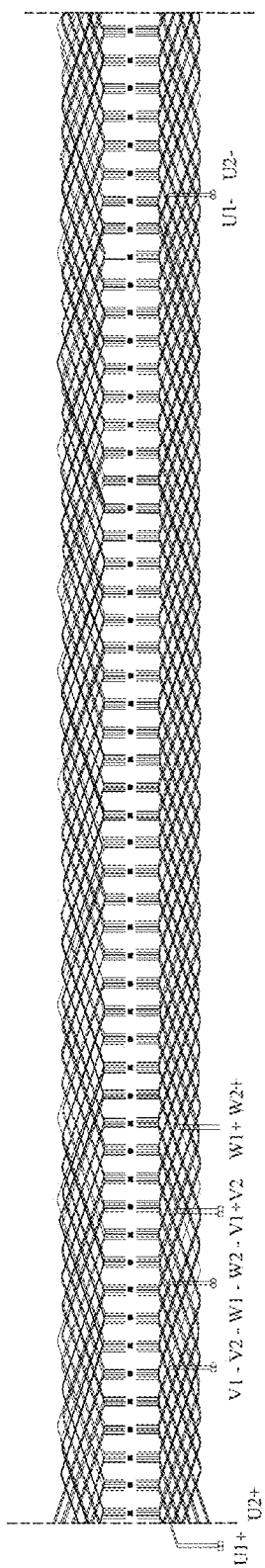
FIG. 16 is a schematic diagram of a connection of a U-phase winding, a V-phase winding, and a W-phase winding according to still another embodiment.

FIG. 15 is a schematic diagram of a connection of two parallel branches of the U-phase winding in this embodiment. FIG. 16 is a schematic diagram of a connection of the U-phase winding, a V-phase winding, and a W-phase winding in this embodiment. With reference to FIG. 13 to FIG. 16, wire-in ends and wire-out ends of six parallel branches of the three phase windings are close to each other, and may directly lead out in parallel, or may lead out after being connected together by using a busbar. Therefore, lead-out distances of the wire-in ends and the wire-out ends are short, and the wire-in ends and the wire-out ends may lead out from the welding end.

Embodiment 4

Figure 17:
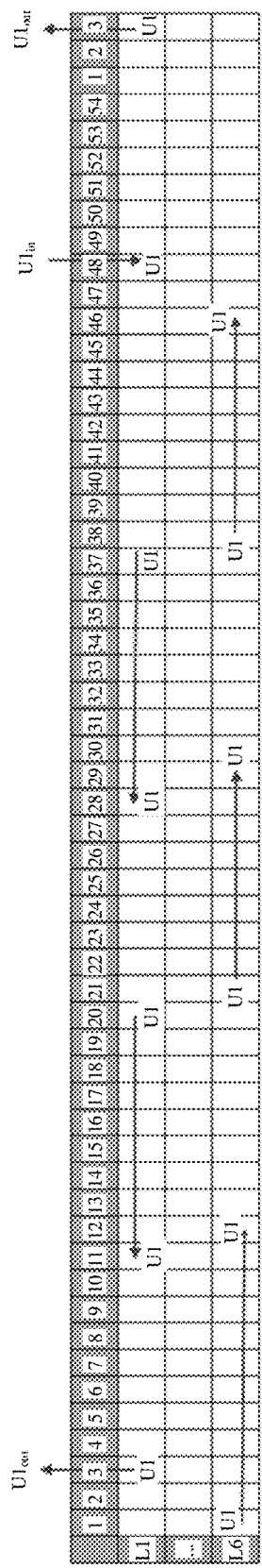
FIG. 17 is a schematic diagram of a connection of a first parallel branch of a U-phase winding according to yet another embodiment.
Figure 18:
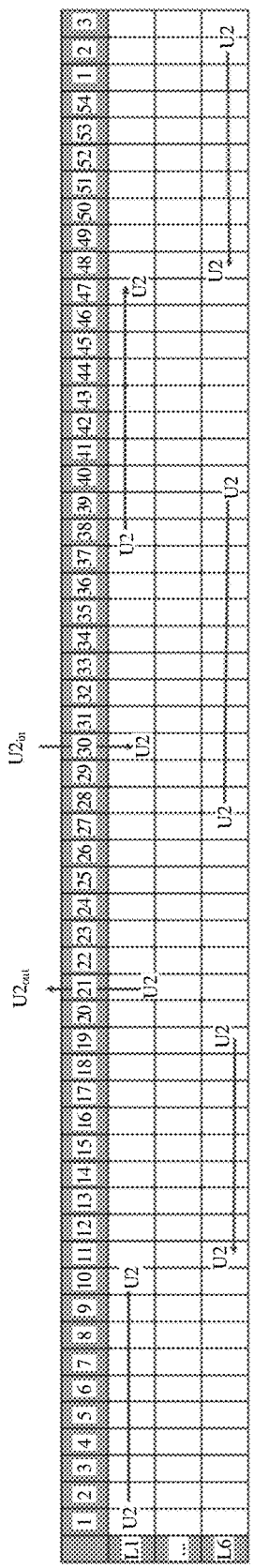
FIG. 18 is a schematic diagram of a connection of a second parallel branch of a U-phase winding according to yet another embodiment.

This embodiment provides a stator. FIG. 17 is a schematic diagram of a connection of a first parallel branch of a U-phase winding in this embodiment. FIG. 18 is a schematic diagram of a connection of a second parallel branch of a U-phase winding in this embodiment.

Refer to FIG. 17 and FIG. 18. In comparison with Embodiment 1, positions of a wire-in end and a wire-out end of each of the first parallel branch and the second parallel branch of each phase are the same as those in Embodiment 1, and a difference lies in that a span of each parallel branch in a first layer and a sixth layer is changed. In Embodiment 1, a combination of spans in the first layer is 9 and 9, and a combination of spans in the sixth layer is 10, 10, and 7. However, in Embodiment 4, the combination of spans of the first layer is 9 and 9, and the combination of spans in the sixth layer is 8, 8, and 11.

FIG. 17 shows only a wiring mode of the first parallel branch at the first layer and the sixth layer. For wiring modes of the remaining intermediate layers from the second layer to the fifth layer, refer to FIG. 9 in Embodiment 1. FIG. 18 shows only a wiring mode of the second parallel branch at the first layer and the sixth layer. For wiring modes of the remaining intermediate layers from the second layer to the fifth layer, refer to FIG. 10 in Embodiment 1.

Embodiment 5

Figure 19:
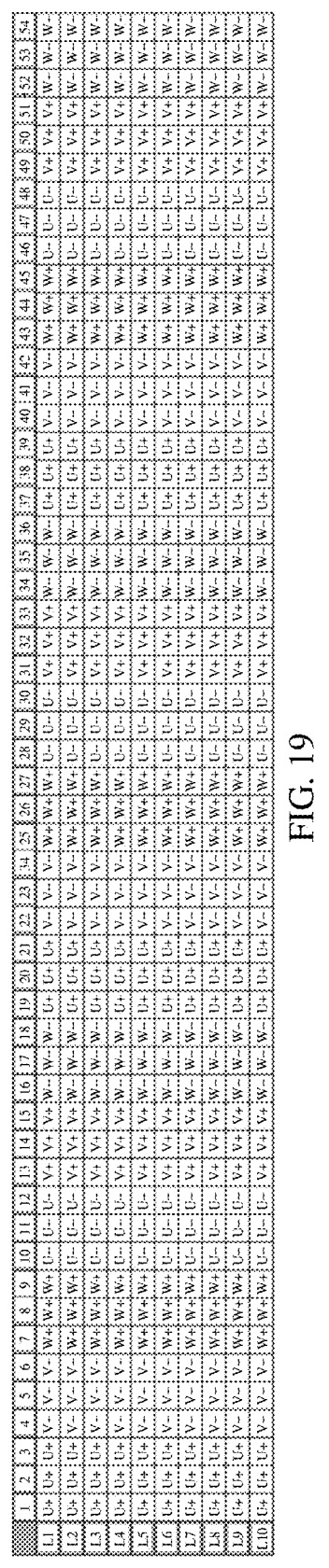
Figure 20:
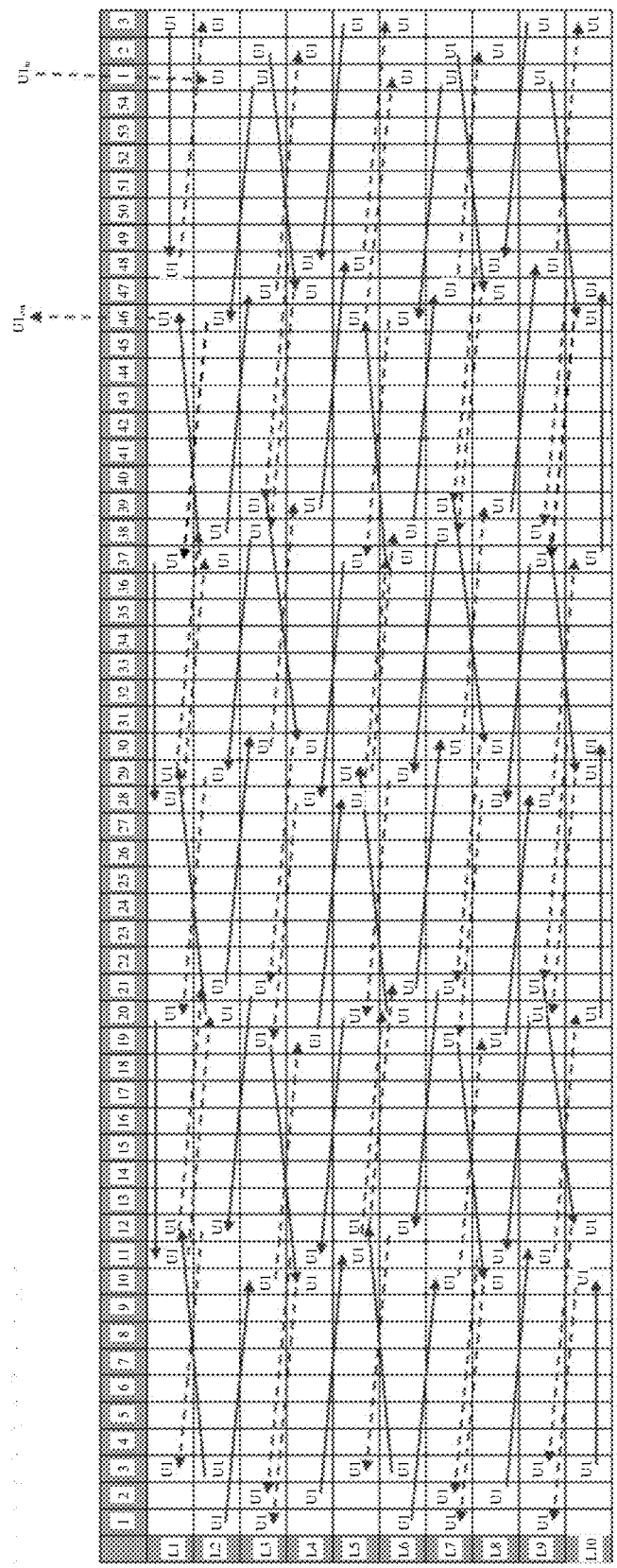
FIG. 20 is a schematic diagram of a connection of a first parallel branch of a U-phase winding according to another embodiment.
Figure 21:
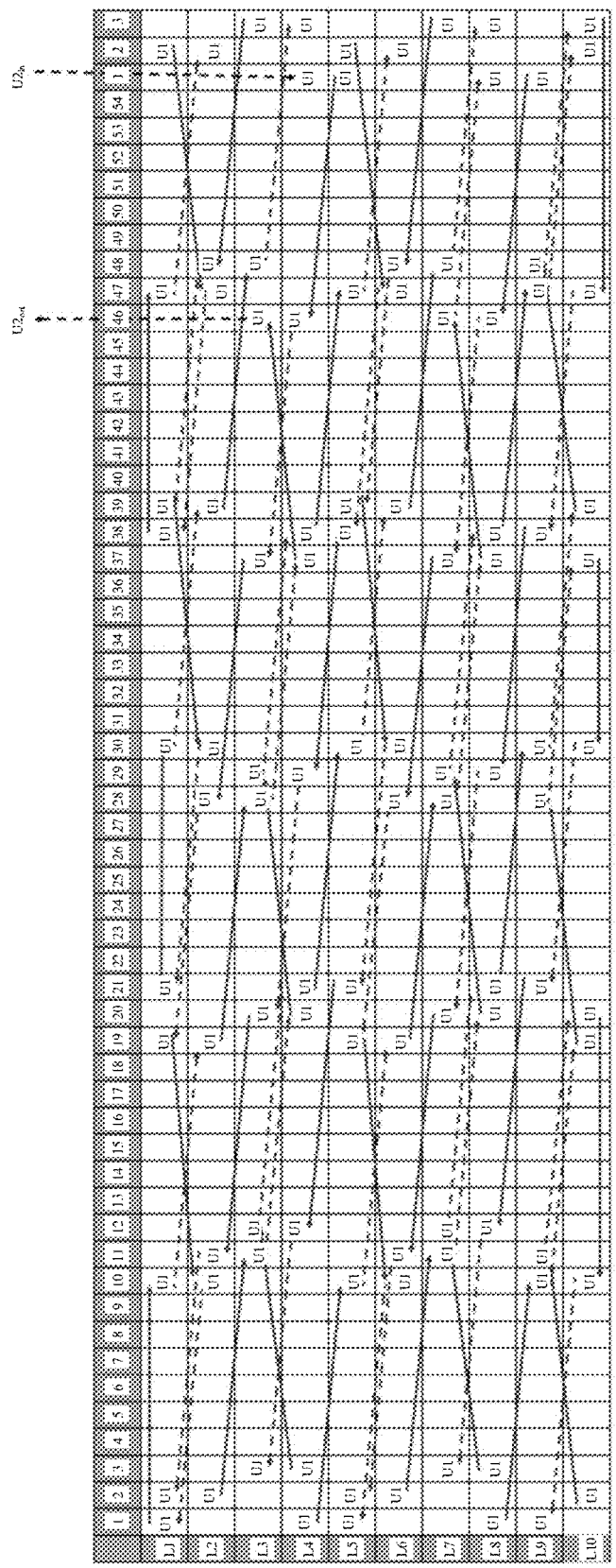
FIG. 21 is a schematic diagram of a connection of a second parallel branch of a U-phase winding according to another embodiment.

This embodiment provides a stator. In the stator, a stator core has 54 winding slots, and a quantity of layers of conductors in each winding slot is 10. The stator winding includes a U-phase winding, a V-phase winding, and a W-phase winding. Each phase winding has two parallel branches. FIG. 19 is a distribution diagram of phase belts of a stator winding in an embodiment. FIG. 20 is a schematic diagram of a connection of a first parallel branch of a U-phase winding in an embodiment. FIG. 21 is a schematic diagram of a connection of a second parallel branch of a U-phase winding in an embodiment.

As shown in FIG. 19, each winding slot has flat wire conductors of 10 layers. A first layer is denoted as L1, a second layer is denoted as L2, a third layer is denoted as L3, a fourth layer is denoted as L4, a fifth layer is denoted as L5, a sixth layer is denoted as L6, a seventh layer is denoted as L7, an eighth layer is denoted as L8, a ninth layer is denoted as L9, and a $10^{th}$ layer is denoted as L10. The first layer is a bottom layer of the winding slot, and the $10^{th}$ layer is a top layer of the winding slot. "+" represents a current flowing into a conductor and "—" represents a current flowing out of a conductor. It should be noted that distribution of the phase belts in FIG. 19 is only described as an example. Symbols "+" and "—" in FIG. 19 are exchanged, for example, replacing symbols "U+" with "U−", replacing symbols "U−" with "U+", and modifying a V phase and a W phase correspondingly are all within the scope of the embodiments.

In FIG. 20 and FIG. 21, a solid line represents a wiring mode of a plug-wire end, and a dotted line represents a wiring mode of a welding end.

The following describes in detail a wiring mode of the first parallel branch of the U-phase winding in this embodiment with reference to FIG. 20. The following describes a wiring mode of the stator winding at the welding end only according to the connection mode represented by the dotted line in FIG. 20. A connecting wire at the plug-wire end of the stator winding may be directly connected through a connected part of a hairpin coil. For details, refer to the connection mode represented by the solid line in FIG. 20.

Refer to FIG. 20. In the first parallel branch of the U-phase winding, a second layer in a first slot is used as a wire-in end $U_{1in}$. As the wire-in end, the second layer in the first slot is not connected, at the welding end of the stator winding, to a flat wire conductor of another layer. Then, the first parallel branch enters from a third layer in a $10^{th}$ slot and leads out from a fourth layer in a $19^{th}$ slot, then enters from a fifth layer in a $28^{th}$ slot and leads out from a sixth layer in a $37^{th}$ slot, then enters from a fifth layer in a $46^{th}$ slot and leads out from a sixth layer in the first slot, then enters from a seventh layer in the $10^{th}$ slot and leads out from an eighth layer in the $19^{th}$ slot, and then enters from a ninth layer in the $28^{th}$ slot and leads out from a $10^{th}$ layer in the $37^{th}$ slot. In this case, after flat wire conductors are connected, the first parallel branch traverses from a first layer to a sixth layer and may be circumferentially disposed around the stator core for at least one circle.

The first parallel branch performs a next traversal according to the foregoing method. The first parallel branch enters a $10^{th}$ layer in a $47^{th}$ slot and leads out from a ninth layer in a $38^{th}$ slot, then enters a $10^{th}$ layer in a $29^{th}$ slot and leads out from an eighth layer in a $20^{th}$ slot, then enters from an eighth layer in an $11^{th}$ slot and leads out from a seventh layer in a second slot, then enters from an eighth layer in the $47^{th}$ slot and leads out from a seventh layer in the $38^{th}$ slot, then enters from a sixth layer in the $29^{th}$ slot and leads out from a fifth layer in the $20^{th}$ slot, then enters from a fourth layer in the $11^{th}$ slot and leads out from a third layer in the second slot, then enters a fourth layer in the $47^{th}$ slot and leads out from a third layer in the $38^{th}$ slot, and then enters from a second layer in the $29^{th}$ slot and leads out from a first layer in the $20^{th}$ slot, and in this case, the first parallel branch completes a second traversal.

Then, the first parallel branch enters from a first layer in the $11^{th}$ slot and leads out from a second layer in the $20^{th}$ slot, then enters from a first layer in the $29^{th}$ slot and leads out from a second layer in the $38^{th}$ slot, then enters from a third layer in the $47^{th}$ slot and leads out from a fourth layer in the second slot, then enters from a fifth layer in the $11^{th}$ slot and leads out from a sixth layer in the $20^{th}$ slot, then enters from a fifth layer in the $29^{th}$ slot and leads out from a sixth layer in the $38^{th}$ slot, then enters from a seventh layer in the $47^{th}$ slot and leads out from an eighth layer in the second slot, and then enters from a ninth layer in the $11^{th}$ slot and leads out from a $10^{th}$ layer in the $20^{th}$ slot, and in this case, the first parallel branch completes a third traversal.

Then, the first parallel branch enters from a $10^{th}$ layer in a $30^{th}$ slot and leads out from a ninth layer in a $21^{st}$ slot, then enters from a $10^{th}$ layer in a $12^{th}$ slot and leads out from a ninth layer in a third slot, then enters from an eighth layer in a $48^{th}$ slot and leads out from a seventh layer in a $39^{th}$ slot, then enters from an eighth layer in the $30^{th}$ slot and leads out from a seventh layer in the $21^{st}$ slot, then enters from a sixth layer in the $12^{th}$ slot and leads out from a fifth layer in the third slot, then enters from a fourth layer in the $48^{th}$ slot and leads out from a third layer in the $39^{th}$ slot, then enters form a fourth layer in the $30^{th}$ slot and leads out from a third layer in the $21^{st}$ slot, and then enters from a second layer in the $12^{th}$ slot and leads out from a first layer in the third slot, and in this case, the first parallel branch completes a fourth traversal.

Then, the first parallel branch enters from a first layer in the $48^{th}$ slot and leads out from a second layer in the third slot, then enters from a first layer in the $12^{th}$ slot and leads out from a second layer in the $21^{st}$ slot, then enters from a third layer in the $30^{th}$ slot and leads out from a fourth layer in the $39^{th}$ slot, then enters from a fifth layer in the $48^{th}$ slot and leads out from a sixth layer in the third slot, then enters from a fifth layer in the $12^{th}$ slot and leads out from a sixth layer in the 21$^{st}$ slot, then enters from a seventh layer in the 30$^{th}$ slot and leads out from an eighth layer in the 39$^{th}$ slot, and then enters from a ninth layer in the 48$^{th}$ slot and leads out from a 10$^{th}$ layer in the third slot, and in this case, the first parallel branch completes a fifth traversal.

Then, the first parallel branch enters from a 10$^{th}$ layer in the 10$^{th}$ slot and leads out from a ninth layer in the first slot, then enters from a 10$^{th}$ layer in the 46$^{th}$ slot and leads out from a ninth layer in the 37$^{th}$ slot, then enters from an eighth layer in the 28$^{th}$ slot and leads out from a seventh layer in the 19$^{th}$ slot, then enters from an eighth layer in the 10$^{th}$ slot and leads out from a seventh layer in the first slot, then enters from a sixth layer in the 46$^{th}$ slot and leads out from a fifth layer in the 37$^{th}$ slot, then enters from a fourth layer in the 28$^{th}$ slot and leads out from a third layer in the 19$^{th}$ slot, then enters from a fourth layer in the 10$^{th}$ slot and leads out from a third layer in the first slot, then enters from a second layer in the 46$^{th}$ slot and leads out from a first layer in the 37$^{th}$ slot, then enters from a first layer in the 28$^{th}$ slot and leads out from a second layer in the 37$^{th}$ slot, and then leads out from a first layer in the 46$^{th}$ slot, to form a wire-out end U$_{1out}$ of the first parallel branch of the U-phase winding.

The following describes in detail a wiring mode of the second parallel branch of the U-phase winding in this embodiment with reference to FIG. 21. The following describes a wiring mode of the stator winding at the welding end only based on the connection mode represented by the dotted line in FIG. 21. A connecting wire at the plug-wire end of the stator winding may be directly connected through a connected part of a hairpin coil. For details, refer to the connection mode represented by the solid line in FIG. 21.

Refer to FIG. 21. In the second parallel branch of the U-phase winding, a fourth layer in a first slot is used as a wire-in end U2 in. As the wire-in end, the fourth layer in the first slot is not connected, at the plug-wire end of the stator winding, to a flat wire conductor of another layer. Then, the second parallel branch enters from a fifth layer in a 10$^{th}$ slot and leads out from a sixth layer in a 19$^{th}$ slot, then enters from a seventh layer in a 28$^{th}$ slot and leads out from an eighth layer in a 37$^{th}$ slot, then enters from a seventh layer in a 46$^{th}$ slot and leads out from an eighth layer in a first slot, then enters from a ninth layer in the 10$^{th}$ slot and leads out from a 10$^{th}$ layer in the 19$^{th}$ slot, and then enters from a ninth layer in the 28$^{th}$ slot and leads out from a 10$^{th}$ layer in the 37$^{th}$ slot, and in this case, the second parallel branch completes a first traversal.

Then, the second parallel branch enters from a 10$^{th}$ layer in a 30$^{th}$ slot and leads out from a ninth layer in a 21$^{st}$ slot, then enters from an eighth layer in a 12$^{th}$ slot and leads out from a seventh layer in a third slot, then enters from a sixth layer in a 48$^{th}$ slot and leads out from a fifth layer in a 39$^{th}$ slot, then enters from a sixth layer in the 30$^{th}$ slot and leads out from a fifth layer in the 21$^{st}$ slot, then enters from a fourth layer in the 12$^{th}$ slot and leads out from a third layer in the third slot, then enters from a second layer in the 48$^{th}$ slot and leads out from a first layer in the 39$^{th}$ slot, and then enters from a second layer in the 30$^{th}$ slot and leads out from a first layer in the 21$^{st}$ slot, and in this case, the second parallel branch completes a second traversal.

Then, the second parallel branch enters from a first layer in the 30$^{th}$ slot and leads out from a second layer in the 39$^{th}$ slot, then enters from a third layer in the 48$^{th}$ slot and leads out from a fourth layer in the third slot, then enters from a third layer in the 12$^{th}$ slot and leads out from a fourth layer in the 21$^{st}$ slot, then enters from a fifth layer in the 30$^{th}$ slot and leads out from a sixth layer in the 39$^{th}$ slot, then enters from a seventh layer in the 48$^{th}$ slot and leads out from an eighth layer in the third slot, then enters from a seventh layer in the 12$^{th}$ slot and leads out from an eighth layer in the 21$^{st}$ slot, then enters form a ninth layer in the 30$^{th}$ slot and leads out from a 10$^{th}$ layer in the 39$^{th}$ slot, and then enters from a ninth layer in the 48$^{th}$ slot and leads out from a 10$^{th}$ layer in the third slot, and in this case, the second parallel branch completes a third traversal.

Then, the second parallel branch enters from a 10$^{th}$ layer in a 47$^{th}$ slot and leads out from a ninth layer in a 38$^{th}$ slot, then enters from an eighth layer in a 29$^{th}$ slot and leads out from a seventh layer in a 20$^{th}$ slot, then enters from a sixth layer in an 11$^{th}$ slot and leads out from a fifth layer in a second slot, then enters from a sixth layer in the 47$^{th}$ slot and leads out from a fifth layer in the 38$^{th}$ slot, then enters from a fourth layer in the 29$^{th}$ slot and leads out from a third layer in the 20$^{th}$ slot, then enters from a second layer in the 11$^{th}$ slot and leads out from a first layer in the second slot, and then enters from a second layer in the 47$^{th}$ slot and leads out from a first layer in the 38$^{th}$ slot, and in this case, the second parallel branch completes a fourth traversal.

Then, the second parallel branch enters a first layer in the 47$^{th}$ slot and leads out from a second layer in a second slot, then enters a third layer in the 11$^{th}$ slot and leads out from a fourth layer in the 20$^{th}$ slot, then enters from a third layer in the 29$^{th}$ slot and leads out from a fourth layer in the 38$^{th}$ slot, then enters from a fifth layer in the 47$^{th}$ slot and leads out from a sixth layer in the second slot, then enters from a seventh layer in the 11$^{th}$ slot and leads out from an eighth layer in the 20$^{th}$ slot, then enters from a seventh layer in the 29$^{th}$ slot and leads out from an eighth layer in the 38$^{th}$ slot, then enters a ninth layer in the 47$^{th}$ slot and leads out from a 10$^{th}$ layer in the second slot, and then enters from a ninth layer in the 11$^{th}$ slot and leads out from a 10$^{th}$ layer in the 20$^{th}$ slot, and in this case, the second parallel branch completes a fifth traversal.

Then, the second parallel branch enters from a 10$^{th}$ layer in the 10$^{th}$ slot and leads out from a ninth layer in the first slot, then enters from an eighth layer in the 46$^{th}$ slot and leads out from a seventh layer in the 37$^{th}$ slot, then enters from a sixth layer in the 28$^{th}$ slot and leads out from a fifth layer in the 19$^{th}$ slot, then enters from a sixth layer in the 10$^{th}$ slot and leads out from a fifth layer in the first slot, then enters from a fourth layer in the 46$^{th}$ slot and leads out from a third layer in the 37$^{th}$ slot, then enters from a second layer in the 28$^{th}$ slot and leads out from a first layer in the 19$^{th}$ slot, then enters from a second layer in the 10$^{th}$ slot and leads out from a first layer in the first slot, then enters from a first layer in the 10$^{th}$ slot and leads out from a second layer in the 19$^{th}$ slot, then enters from a third layer in the 28$^{th}$ slot and leads out from a fourth layer in the 37$^{th}$ slot, and then leads out from a third layer in the 46$^{th}$ slot, to form a wire-out end U2out of the second parallel branch of the U-phase winding.

As shown in FIG. 19 to FIG. 21, in this embodiment, a combination of spans in the first layer of the first parallel branch is 9, 9, and 9, a combination of spans in the 10$^{th}$ layer is 10, 7, and 10, and each of spans between every adjacent two layers from the second layer to the ninth layer is 9. U1in, U1out, U2 in, and U2out each lead out from the welding end of the stator winding, that is, lead out from a side of the bent part of the hairpin coil. U1in and U1out separately lead out by using a conducting wire, and U2in and U2out separately lead out by using a conducting wire. In this structure, spans of most flat wire conductors are the same. Therefore, when the stator winding is wound, hairpin coils of a same model may be used, so that a quantity of models of hairpin coils is reduced and automatic insertion is facilitated. In addition, spans of parallel branches are the same at the welding end, to facilitate connection.

A wiring mode of a first parallel branch of the V-phase winding and a wiring mode of a first parallel branch of the W-phase winding may be obtained through translation on the basis of FIG. 20. A wiring mode of a second parallel branch of the V-phase winding and a wiring mode of a second parallel branch of the W-phase winding may be obtained through translation on the basis of FIG. 21.

It can be understood that the foregoing embodiments are only described as examples. A span of the first layer and a span of the six layer can be interchanged, and same connection effects can be achieved.

In conclusion, the stator in embodiments has the following advantages.
  (1). Because of a balanced circuit connection mode for parallel branches of each phase winding, generation of alternating current loss of the stator winding can be effectively reduced, a cross current between parallel branches is avoided, efficiency of the motor is improved, a temperature rise of the motor is reduced, and more possibilities are provided for a motor solution. In addition, a wire-in end and a wire-out end of the stator winding can be changed as required, which is flexible and convenient.
  (2). In a motor with the winding structure, few types of hairpin coils are used, hairpin coils at the welding end of the stator winding have same spans and same head twisting angles, welding points are symmetrically distributed around a circumference, wire-in ends and wire-out ends of the phase windings are regularly distributed, and difficulty of manufacturing the winding is low.
  (3) In the stator, flat wire conductors in a same winding slot are in-phase, and interphase insulating paper is not needed for the flat wire conductors in the same winding slot. Therefore, insulation costs and insertion difficulty of the motor are reduced, and a copper slot fill of the motor is improved.
  (4) The stator winding can implement flexible conversion between wire-in and wire-out ends at the plug-wire end and wire-in and wire-out ends at the welding end.
  (5). Incoming lines and outgoing lines of all parallel branches of the three phase windings may directly lead out in parallel or may lead out after being connected together by using busbars. Accordingly, lead-out distances of the wire-in ends and the wire-out ends are short.
  (6). In the flat wire conductor of each layer, a flat wire conductor of a first layer may be bent in a direction away from an axis of the stator core during wiring, and a flat wire conductor of a sixth layer may be bent in a direction close to the axis of the stator core during wiring. Therefore, wiring difficulty can be reduced.

The foregoing descriptions are merely embodiments, but are not intended as limiting. Any variation or replacement readily figured out by a person skilled in the art shall fall within the scope of the embodiments.

What is claimed is:

1. A stator of a flat wire motor, comprising:
  a stator core, wherein an inner wall of the stator core is provided with M winding slots uniformly disposed in a circumferential direction of the inner wall of the stator core, any one of the M winding slots extends in an axial direction of the stator core, and M is a natural number that is a multiple of 3; and
  a stator winding, wherein the stator winding comprises flat wire conductors inserted in the M winding slots, N layers of the flat wire conductors are disposed in any one of the M winding slots, the flat wire conductors each are connected by using a connecting wire to form a first-phase winding, a second-phase winding, and a third-phase winding, any phase winding comprises a plurality of phase units, phase units of the first-phase winding, phase units of the second-phase winding, and phase units of the third-phase winding are sequentially and periodically arranged along the inner wall of the stator core, and each phase winding comprises P parallel branches, wherein N is a multiple of 2 and is a natural number greater than 2, and P is a natural number greater than or equal to 1; and any one of the P parallel branches connects M·N/3P layers of the flat wire conductors, any one of the flat wire conductors in the any one of the P parallel branches is connected to an in-phase flat wire conductor of an adjacent layer or a same layer in a winding slot at an adjacent span, and flat wire conductors in a same winding slot are in-phase, wherein each phase winding comprises a first parallel branch and a second parallel branch, a wire-in end of the first parallel branch is connected to a flat wire conductor of an $(n1)^{th}$ layer in an $(m1)^{th}$ winding slot, and a wire-out end of the first parallel branch is connected to a flat wire conductor of an $(n2)^{th}$ layer in an $(m2)^{th}$ winding slot.

2. The stator according to claim 1, wherein each phase winding comprises two of the P parallel branches.

3. The stator according to claim 2, wherein a difference between m1 and m2 is equal to a span, and an absolute value of a difference between n1 and n2 is less than or equal to 1, a wire-in end of the second parallel branch is connected to a flat wire conductor of an $(n1+2)^{th}$ layer in the $(m1)^{th}$ winding slot, a wire-out end of the second parallel branch is connected to a flat wire conductor of an $(n2+2)^{th}$ layer in the $(m2)^{th}$ winding slot, m1 and m2 are natural numbers from 1 to M in a same phase winding, and n1 and n2 are natural numbers from 2 to N−2 in a same parallel branch.

4. The stator according to claim 2, wherein a wire-in end of the second parallel branch is connected to a flat wire conductor of an $(n1+2)^{th}$ layer in the $(m1)^{th}$ winding slot and a wire-out end of the second parallel branch is connected to a flat wire conductor of an $(n2+2)^{th}$ layer in the $(m2)^{th}$ winding slot.

5. The stator according to claim 1, wherein a quantity of the M winding slots is 54.

6. The stator according to claim 5, wherein a quantity of the N layers of the flat wire conductors is 6 or 10.

7. The stator according to claim 5, wherein a span of any one of the P parallel branches at a first layer is 9, and a combination of spans at an $N^{th}$ layer is 10, 10, and 7, or 8, 8, and 11.

8. The stator according to claim 5, wherein a combination of spans of any one of the P parallel branches at a first layer is 10, 10, and 7, or 8, 8, and 11, and a span at an $N^{th}$ layer is 9.

9. The stator according to claim 5, wherein a span of any one of the P parallel branches at a second layer to an $(N−1)^{th}$ layer is 9.

10. The stator according to claim 5, wherein a combination of spans at an $N^{th}$ layer is 10, 10, and 7, or 8, 8, and 11.

11. The stator according to claim 5, wherein a combination of spans at an $N^{th}$ layer is 10, 10, and 7.

12. The stator according to claim 5, wherein a combination of spans at an $N^{th}$ layer is 8, 8, and 11.

13. The stator according to claim 5, wherein a combination of spans of any one of the P parallel branches at a first layer is 10, 10, and 7, or 8, 8, and 11.

14. The stator according to claim 5, wherein a combination of spans of any one of the P parallel branches at a first layer is 10, 10, and 7.

15. The stator according to claim 5, wherein a combination of spans of any one of the P parallel branches at a first layer is 8, 8, and 11.

16. The stator according to claim 1, wherein a wire-out end of any one of the P parallel branches leads out from a flat wire conductor of a first layer or a flat wire conductor of an $N^{th}$ layer.

17. The stator according to claim 1, wherein the stator core is provided with a wire-inlet end and a wire-outlet end, and head twisting directions of the stator winding are the same at the wire-outlet end.

18. A flat wire motor, comprising a rotor and the stator according to claim 1, wherein the rotor is disposed in a space enclosed by an inner wall of a stator core.

19. A powertrain, comprising a reducer and the flat wire motor according to claim 18, wherein the flat wire motor is in transmission connection with the reducer.

20. A vehicle, comprising the powertrain according to claim 19.

* * * * *